US010311158B2

(12) United States Patent
Cradick et al.

(10) Patent No.: US 10,311,158 B2
(45) Date of Patent: Jun. 4, 2019

(54) STREAMLINING TUPLE PROCESSING BY DELIVERING TUPLE ATTRIBUTES TO ASSOCIATED OPERATORS

(71) Applicant: International Business Machines Corporation, Armonk, NY (US)

(72) Inventors: Ryan K. Cradick, Oronoco, MN (US); Cory J. Kleinheksel, Ames, IA (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 15/174,265

(22) Filed: Jun. 6, 2016

(65) Prior Publication Data

US 2017/0351736 A1    Dec. 7, 2017

(51) Int. Cl.
*G06F 17/30* (2006.01)
*H04L 29/06* (2006.01)

(52) U.S. Cl.
CPC ........ *G06F 17/30516* (2013.01); *H04L 65/60* (2013.01)

(58) Field of Classification Search
CPC ........... G06F 17/30516; G06F 17/3095; G06F 17/30958; H04L 65/60
See application file for complete search history.

(56) References Cited

U.S. PATENT DOCUMENTS

| | | | |
|---|---|---|---|
| 5,836,014 A | 11/1998 | Faiman, Jr. | |
| 7,644,110 B2 | 1/2010 | Nishizawa et al. | |
| 8,560,526 B2 | 10/2013 | Santosuosso et al. | |
| 8,560,602 B2 | 10/2013 | Andrade et al. | |
| 9,147,010 B2 | 9/2015 | Branson et al. | |
| 9,971,851 B2 | 5/2018 | Cradick et al. | |
| 9,996,632 B2 | 6/2018 | Cradick et al. | |
| 2007/0203693 A1 | 8/2007 | Estes | |
| 2013/0018943 A1* | 1/2013 | Andrade | G06F 9/548 709/203 |
| 2014/0164356 A1 | 6/2014 | Branson et al. | |
| 2014/0278337 A1* | 9/2014 | Branson | G06F 11/3457 703/22 |
| 2014/0289186 A1 | 9/2014 | Barsness et al. | |
| 2014/0289240 A1* | 9/2014 | Barsness | G06F 17/30516 707/736 |
| 2014/0365614 A1 | 12/2014 | Branson et al. | |
| 2014/0373019 A1* | 12/2014 | Branson | G06F 17/30943 718/102 |
| 2015/0271236 A1 | 9/2015 | Chen et al. | |

(Continued)

OTHER PUBLICATIONS

List of IBM Patents or Patent Applications Treated as Related, Jul. 5, 2016, 1 page.

(Continued)

*Primary Examiner* — Leslie Wong
(74) *Attorney, Agent, or Firm* — Robert Bunker; Edell, Shapiro & Finnan, LLC (57) ABSTRACT

Streamlining a stream computing environment by distributing tuple attributes to associated operators in the environment involves receiving a stream of tuples for processing by one or more stream operators. A tuple in the stream of tuples is analyzed to identify one or more data attributes required by the one or more stream operators during processing. Each of the identified attributes is distributed to particular operators that require the identified attribute.

17 Claims, 8 Drawing Sheets

(56) References Cited

U.S. PATENT DOCUMENTS

| 2016/0071233 | A1 | 3/2016 | MacKo |
| 2016/0306896 | A1 | 10/2016 | Paradies |
| 2016/0342710 | A1 | 11/2016 | Cradick et al. |
| 2016/0344788 | A1 | 11/2016 | Cradick et al. |

OTHER PUBLICATIONS

Udzir, NI. et al.; "Implementing contract net in tuple space models"; IASTED International Conference on Parallel & Distributed Computing Networks; pp. 325-330; 2004.

Lu, H. et al.; "Efficient and Scalable Continuous Skyline Monitoring in Two-tier Streaming Settings"; Information Systems, vol. 38, No. 1, pp. 68-81; Mar. 2013.

Anonymously; "Optimized Migration of a Strream"; http://ip.com/IPCOM/000244000D; Nov. 4, 2015.

Siemens et al.; "Multi-Port Embedded Data-Stream Concentrator"; http://ip.com/IPCOM/000210906D; Sep. 16, 2011.

U.S. Appl. No. 14/718,205, "Processing a Stream of Tuples", filed May 21, 2015, 49 pages.

List of IBM Patents or Patent Applications Treated as Related, Jun. 14, 2016, 1 page.

M. Hirzel, IBM Streams Processing Language: Analyzing Big Data in Motion, Jul. 2013, 11 pages.

Cradick, et al., "Processing a Stream of Tuples", U.S. Appl. No. 14/749,073, filed Jun. 24, 2015, 45 pages.

Branson, et al., "Reconfiguring an Operator Graph Based on Attribute Usage", U.S. Appl. No. 14/742,774, filed Jun 18,2015, 40 pages.

Ballard, et al., "IBM InfoSphere Streams: Harnessing Data in Motion", IBM Redbooks, First Edition. Sep. 2010. 360 pages. © Copyright International business machines Corporation 2010.

Branson, et al., "Generating Differences for Tuple Attributes", U.S. Appl. No. 13/919,378. Filed Jun. 17, 2013. 48 pages.

Branson, et al., "Generating Differences for Tuple Attributes", U.S. Appl. No. 14/094,095. Filed Dec. 2, 2013. 49 pages.

Branson, et al., "Reconfiguring an Operator Graph Based on Attribute Usage", U.S. Appl. No. 13/864,784. Filed Apr. 17, 2013, 40 pages.

Branson, et al., "Runtime Tuple Attribute Compression", U.S. Appl. No. 13/867,169. Filed Apr. 22, 2013, 40 pages.

Branson, et al., "Compile-Time Tuple Attribute Compression", U.S. Appl. No. 13/867,211. Filed Apr. 22, 2013, 34 pages.

\* cited by examiner

STREAMLINING TUPLE PROCESSING BY DELIVERING TUPLE ATTRIBUTES TO ASSOCIATED OPERATORS

BACKGROUND

Present invention embodiments relate to stream computing and, in particular, to streamlining a stream computing environment by distributing tuple attributes to associated operators in the stream environment.

Generally, stream computing processes continuously flowing or streaming data through an operator graph, which may also be referred to as a stream processing application graph. Stream computing enables continuous and fast analysis of massive volumes of moving data to help improve the speed of business insight and decision-making and is often most appropriate where there are very large volumes of data that need to be processed in very short amounts of time. In order to effectuate stream computing, a set of operators (processes) are organized in a stream operator graph so that the stream operators may work in parallel. Generally, stream operator graphs are made up of: (1) operators that apply some logic to a stream input and generate a stream output; (2) streams that carry data from one operator to another; and (3) tuples, which are segments of data that flow through a stream.

An operator can generate some data and pass it to another operator to perform a task before this second operator passes the data (possibly modified) to a third operator and so on. In stream processing, many such operators work together to implement a larger algorithm, with their data exchanges forming the stream operator graph. For example, a first stream operator may operate on a first portion of a tuple passing therethrough, a second operator may operate on a second portion of the tuple. Since the first operator only operates on a portion of the tuple, the first operator may copy and forward unused data (e.g., tuple attributes) and pass the unused data downstream to subsequent operators. Put another way, the operators perform incremental processing on data (e.g., the tuples) that arrive on their input ports and then forward the results on their output ports to downstream operators.

This incremental aspect naturally encourages data tuples to be created with many attributes, some of which could be large in size. This is natural because the data object (the tuple) represents a whole entity to be processed by the graph (although a single operator may not process all aspects of the object). Consequently, in some instances, large amounts of data (attribute data) must be read, copied, and forwarded several times before reaching an operator that actually consumes the data of that attribute in some way. This unnecessary reading, copying, and/or forwarding is a considerable computation/communication waste that may easily cause network congestion. Moreover, many streams applications are larger than a single computer can handle, so their processes may be spread across multiple processing nodes in a cluster or cloud. As a stream computing environment becomes more distributed (e.g., in the cloud), the resources executing the operators may not be in the same data center, and the unnecessary read, copy, and forwarding operations may cause increases in bottlenecks and communication costs (e.g., clouds charging per byte entering/exiting a site).

SUMMARY

According to one embodiment of the present invention, streamlining a stream computing environment by distributing tuple attributes to associated operators in the environment involves receiving a stream of tuples for processing by one or more stream operators. A tuple in the stream of tuples is analyzed to identify one or more data attributes required by the one or more stream operators during processing. Each of the identified attributes is distributed to particular operators of the one or more stream operators that require the identified attribute.

BRIEF DESCRIPTION OF THE DRAWINGS

Generally, like reference numerals in the various figures are utilized to designate like components.

DETAILED DESCRIPTION

Presented herein are techniques for streamlining a computing environment that is configured to process data streams (referred to herein as a stream computing environment) by distributing tuple attributes to operators in the computing environment. Generally, the techniques provided herein eliminate unnecessary copy-forwarding of tuple attributes by distributing tuple attributes to only the operators that will consume or process that particular attribute. Then, a streamlined tuple can be propagated through an operator graph without copy-forwarding unconsumed attributes each time the tuple is processed through an operator.

More specifically, the techniques presented herein analyze stream computing operator graphs to determine where to deliver tuple attributes and then deliver the tuple attributes accordingly. In some embodiments, the necessary attributes are delivered to an operator as an associated tuple arrives at that operator, but in other embodiments, the attributes are delivered to an operator, stored until an associated tuple arrives (e.g., in local memory), and consumed upon arrival of the associated tuple (e.g., as the tuple is processed as a whole directly from local memory). Either way, the distribution/delivery of tuple attributes eliminates wasteful copy-forward processes typically performed by stream computing environments. The techniques presented herein may also streamline waste collection in a stream computing environment since it is relatively simple to recognize if attribute data stored in local memory has been consumed and/or used.

By comparison, conventional stream processing environments propagate tuples, with all of their attributes, through each operator in a particular data path. Consequently, if a tuple includes attributes that are needed by a downstream operator (e.g., will be consumed by a downstream operator), any upstream operators must copy and forward the data for those attributes.

One approach to address this copy-forwarding problem involves storing tuple attributes at an originating operator, replacing the attributes with references to the stored data, and subsequently allowing access to or distributing the attributes stored on the originating operator. However, this solution still requires references to be resolved upon arrival of a tuple at an operator, which is likely to cause execution speed to suffer. Moreover, if an operator is not on the same node as the originating operator and the attributes are stored at an originating operator, data must be remotely retrieved and read into local memory once a tuple arrives. In other words, communications between operators must be carried out in response to a tuple arriving at an operator during processing. Consequently, the system must allow for remote memory access or write data tuple attributes to a shared disk. This may be particularly inefficient, with respect to both cost and processing time, in distributed environments (or even when a single node is outside of the data center network of the originating nodes). Additionally, if a streaming environment is distributed across multiple networks, it may become difficult to control garbage collection and memory management when only references are stored at the operators.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (e.g., processing elements), as well as by replicating processing elements on multiple nodes and balancing a load among the replicated processing elements. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. In addition, stream operators in the same operator graph may be hosted on different nodes, e.g., on different computing nodes or on different cores of a computing node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. Additionally, a tuple may include metadata (e.g., about the tuple). A tuple may be extended by adding one or more additional attributes (or metadata) thereto. As used herein, "stream" or "data stream" refers to a sequence of tuples. Generally, a stream may be considered a pseudo-infinite sequence of tuples.

As a tuple is processed by stream operators, the tuple may be changed in some manner. For example, one or more attribute or metadata may be added, deleted, or modified.

Often, a stream operator may change a single attribute. Generally, a particular tuple output by a stream operator or processing element may not be considered to be the same tuple as a corresponding input tuple, even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

Figure 1:
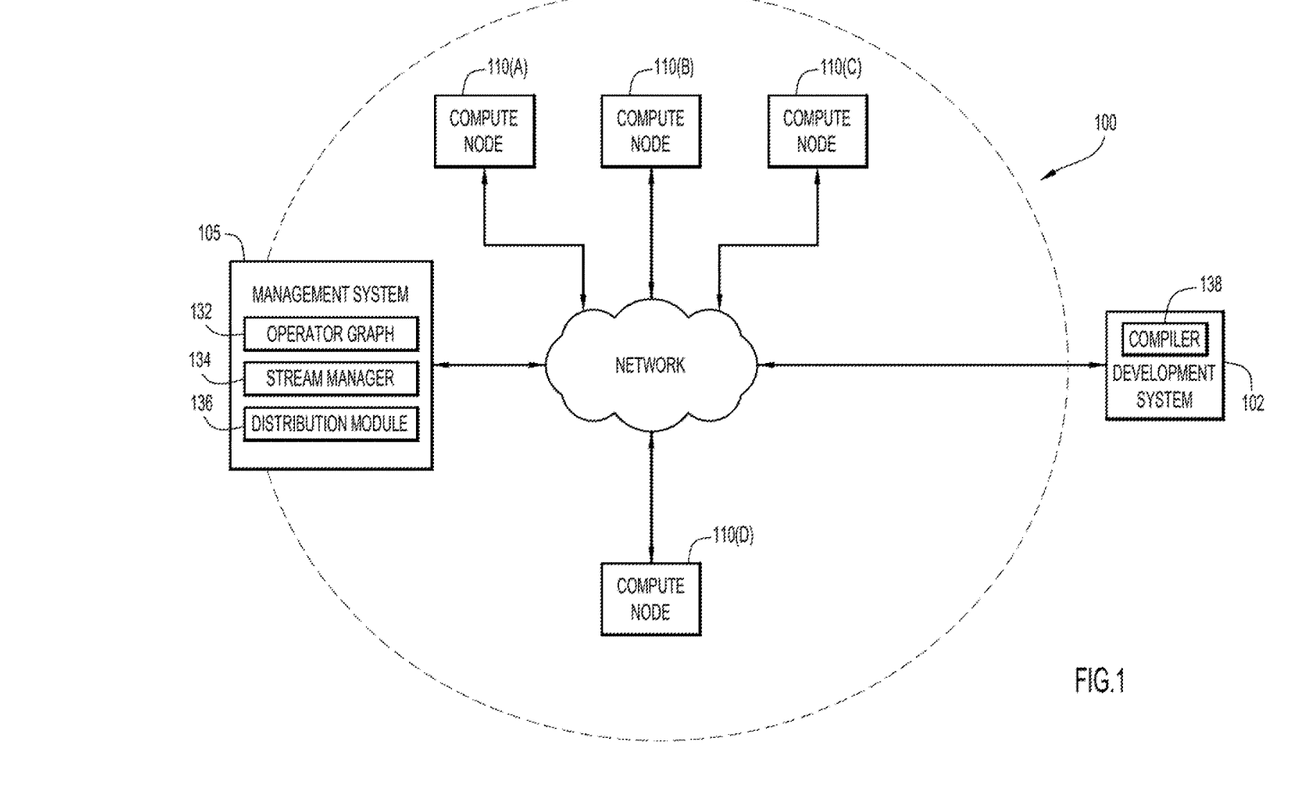
FIG. 1 illustrates an example environment in which the present general inventive concept can be embodied.

FIG. 1 illustrates one exemplary computing infrastructure 100 that may be configured to execute a stream computing application, according to some embodiments. The computing infrastructure 100 includes a management system 105 and two or more computing nodes 110A-110D—e.g., hosts—which are communicatively coupled to each other using one or more communications networks 120. The communications network 120 may include one or more servers, networks, or databases, and may use a particular communication protocol to transfer data between the computing nodes 110A-110D. A server 102 may also be communicatively coupled with the management system 105 and the computing nodes 110 either directly or via the communications network 120.

Figure 3:
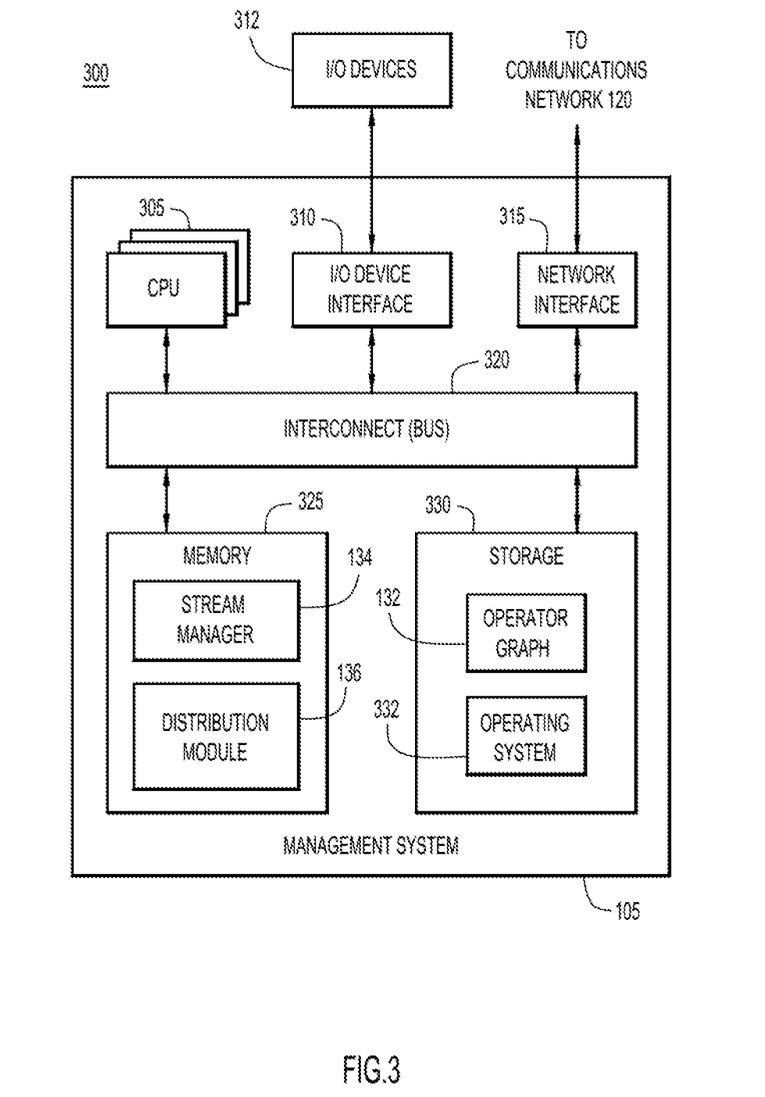
FIG. 3 is a block diagram of the management system of FIG. 1, according to an embodiment of the present invention.

The management system 105 can control the management of the computing nodes 110A-110D (discussed further on FIG. 3). The management system 105 can have an operator graph 132 with one or more stream operators and a stream manager 134 to control the management of the stream of tuples in the operator graph 132. The management system 105 also includes a distribution module 136 configured to deliver or distribute tuple attributes to operators in the operator graph 132. As is discussed in more detail below, the stream manager 134 may act in concert with and/or in response to operations of the distribution module 136, such that the operator graph 132, or operators therein, is automatically adjusted, insofar as storing an attribute in the local memory of an operator may be considered an adjustment, in response to the distribution of tuple attributes within the operator graph 132.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
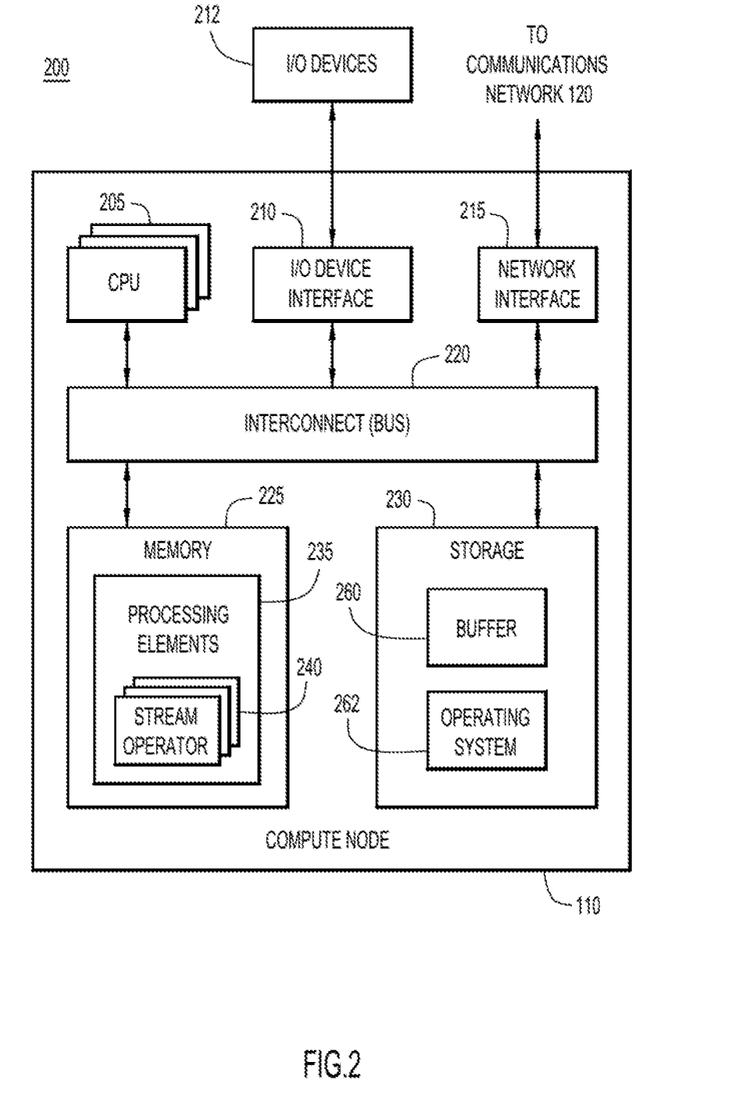
FIG. 2 is a block diagram of a computing node of FIG. 1, according to an embodiment of the present invention.

FIG. 2 is a more detailed view of a computing node 110, which may be the same as one of the computing nodes 110A-110D of FIG. 1, according to an example embodiment. The computing node or device is only one example of a suitable computing node for computing environment 100 and is not intended to suggest any limitation as to the scope of use or functionality of embodiments of the invention described herein. Computing node 110 may be described in the general context of computer system executable instructions, such as program modules, being executed by a computer system. Generally, program modules may include routines, programs, objects, components, logic, data structures, and so on that perform particular tasks or implement particular abstract data types. Computing node 110 may be practiced in distributed cloud computing environments where tasks are performed by remote processing devices that are linked through a communications network. In a distributed cloud computing environment, program modules may be located in both local and remote computer system storage media including memory storage devices.

The computing node 110 may include, without limitation, one or more processors (CPUs) 205, a network interface 215, an interconnect 220, a memory 225, and a storage 230 and is capable of being implemented and/or performing any of the functionality set forth herein. The computing node 110 may also include an I/O device interface 210 used to connect I/O devices 212 to the computing node 110.

The interconnect 220 is used to transmit programming instructions and application data between each CPU 205, I/O device interface 210, storage 230, network interface 215, and memory 225. The interconnect 220 may be one or more busses, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Each CPU 205 retrieves and executes programming instructions stored in the memory 225 or storage 230. Similarly, the CPU 205 stores and retrieves application data residing in the memory 225. The CPUs 205 may be a single CPU, multiple CPUs, or a single CPU having multiple processing cores in various embodiments. In one embodiment, a processor 205 may be a digital signal processor (DSP). More generally, each CPU 205 is operational with numerous other general purpose or special purpose computing system environments or configurations. Examples of well-known computing systems, environments, and/or configurations that may be suitable for use with computing node 110 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computing node 110 may communicate with one or more external devices 212, such as a keyboard, a pointing device, a display, etc.; one or more devices that enable a user to interact with computing node 110; and/or any devices (e.g., network card, modem, etc.) that enable computing node 110 to communicate with one or more other computing devices. Such communication can occur via Input/Output (I/O) interface 210. Still yet, computing node 110 can communicate with one or more networks, such as network 120, via network interface 215. As depicted, network interface 215 communicates with the other components of computing node 110 via bus 220. It should be understood that although not shown, other hardware and/or software components could be used in conjunction with computing node 110. Examples, include, but are not limited to: microcode, device drivers, redundant processing units, external disk drive arrays, RAID systems, tape drives, and data archival storage systems, etc.

Computing node 110 typically includes a variety of computer system readable media. Such media may be any available media that is accessible by computing node 110, and it includes both volatile and non-volatile media, removable and non-removable media. The memory 225 is generally included to be representative of a random access memory (RAM), e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. By way of example only, storage system 230 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 220 by one or more data media interfaces. As will be further depicted and described below, memory 225 may include at least one program product having a set (e.g., at least one) of program modules that are configured to carry out the functions of embodiments of the invention.

Still referring to FIG. 2, one or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same computing node 110 or on other computing nodes that are accessible via communications network 120. For example, a processing element 235 on computing node 110A may output tuples to a processing element 235 on computing node 110B.

The storage 230 may include a buffer 260. Although shown as being in storage, the buffer 260 may also be located in the memory 225 of the computing node 110 or in a combination of both memories. Moreover, storage 230 may include storage space that is external to the computing node 110, such as in a cloud.

The computing node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

FIG. 3 is a more detailed view of the management system 105 of FIG. 1 according to some embodiments. The management system 105 depicted in FIG. 3 is only one example of a suitable management system for computing environment 100 and is not intended to suggest any limitation as to the scope of use or functionality of embodiments of the invention described herein. Similar to computing node 110, the management system 105 may be described in the general context of computer system executable instructions, such as program modules, being executed by a computer system. As mentioned, program modules may include routines, programs, objects, components, logic, data structures, and so on that perform particular tasks or implement particular abstract data types. Management system 105 may also be practiced in distributed cloud computing environments where tasks are performed by remote processing devices that are linked through a communications network. In a distributed cloud computing environment, program modules may be located in both local and remote computer system storage media including memory storage devices.

The management system 105 may include, without limitation, one or more processors (CPUs) 305, a network interface 315, an interconnect 320, a memory 325, and a storage 330 and is capable of being implemented and/or performing any of the functionality set forth herein. The management system 105 may also include one or more operating systems 332 stored partially in memory 325 and/or storage 330, and an I/O device interface 310 connecting I/O devices 312, e.g., keyboard, display, and mouse devices, to the management system 105. The description of corresponding components/elements in computing device 110 included above may also apply to these components/elements. For example, each CPU 305 retrieves and/or executes application data and programming instructions stored in the memory 325 or storage 330. The interconnect 320 is used to move data, such as programming instructions and application data, between the CPU 305, I/O device interface 310, storage unit 330, network interface 315, and memory 325. The operating system 332 provides an interface between various hardware resources, including the CPU 305, and processing elements and other components of the stream computing application.

Additionally, the memory 325 may store a stream manager 134 and a distribution module 136 while the storage 330 may store an operator graph 132. The operator graph 132 may define how tuples are routed to processing elements 235 (FIG. 2) for processing. The modules and manager (e.g., including distribution module 136) generally carry out the functions and/or methodologies of embodiments of the invention as described herein.

Figure 4:
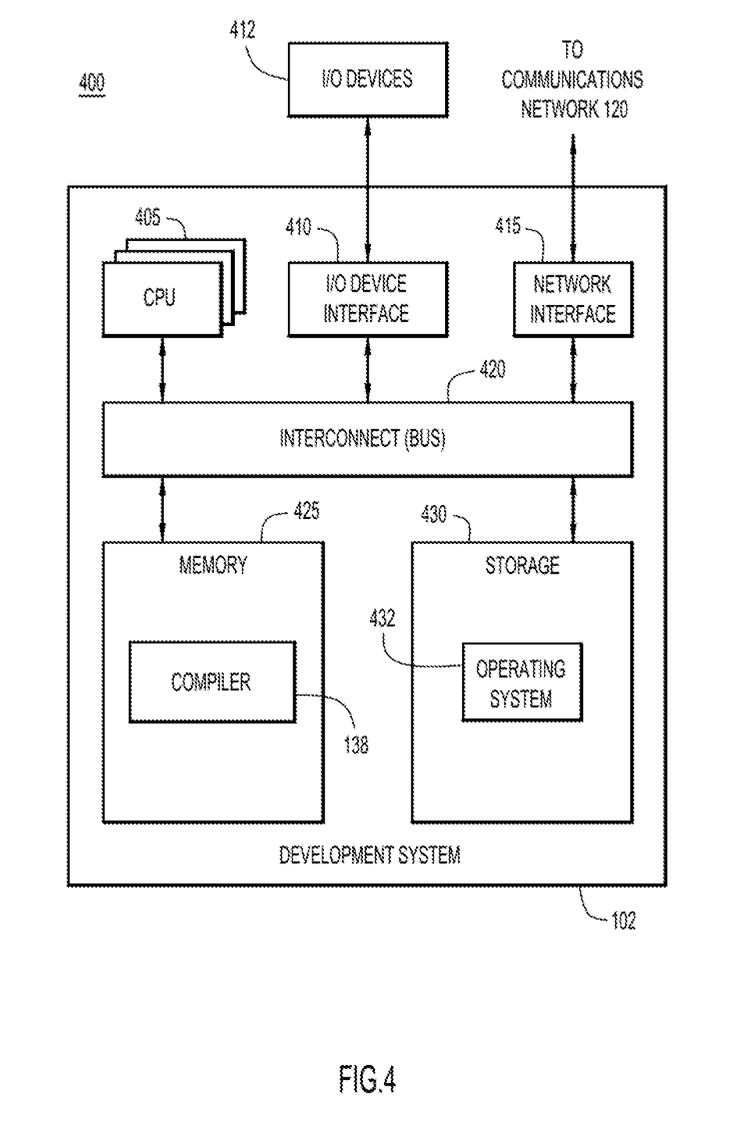
FIG. 4 is a block diagram of the development system of FIG. 1, according to an embodiment of the present invention.

FIG. 4 is a more detailed view of the development system 102 of FIG. 1 according to some embodiments. The development system 102 depicted in FIG. 3 is only one example of a suitable development system for computing environment 100 and is not intended to suggest any limitation as to the scope of use or functionality of embodiments of the invention described herein. Similar to computing node 110 and the management system 105, the development system 102 may be described in the general context of computer system executable instructions, such as program modules, being executed by a computer system. As mentioned, program modules may include routines, programs, objects, components, logic, data structures, and so on that perform particular tasks or implement particular abstract data types. Development system 102 may also be practiced in distributed cloud computing environments where tasks are performed by remote processing devices that are linked through a communications network. In a distributed cloud computing environment, program modules may be located in both local and remote computer system storage media including memory storage devices.

The development system 102 may include, without limitation, one or more processors (CPUs) 405, a network interface 415, an interconnect 420, a memory 425, and storage 430. The development system 102 may also include one or more operating systems 432 stored partially in memory 425 and/or storage 430, and an I/O device interface 410 connecting I/O devices 412, e.g., keyboard, display, and mouse devices, to the compiler system 102. The description of corresponding components/elements in computing device 110 included above may also apply to these components/elements. For example, each CPU 405 retrieves and/or executes application data and programming instructions stored in the memory 425 or storage 430. The interconnect 420 is used to move data, such as programming instructions and application data, between the CPU 405, I/O device interface 410, storage unit 430, network interface 415, and memory 425. The operating system 432 provides an interface between various hardware resources, including the CPU 405, and processing elements and other components of the stream computing application.

In addition to these components, the memory 425 may store a compiler 138. The compiler 138 compiles modules, which include source code or statements, into the object code, which includes machine instructions that execute on a processor. In one embodiment, the compiler 138 may translate the modules into an intermediate form before translating the intermediate form into object code. The compiler 138 may output a set of deployable artifacts that may include a set of processing elements and an application description language file (ADL file), which is a configuration file that describes the stream computing application. In some embodiments, the compiler 138 may be a just-in-time compiler that executes as part of an interpreter. In other embodiments, the compiler 138 may be an optimizing compiler. In various embodiments, the compiler 138 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 138 may be represented by an operator graph, e.g., the operator graph 132 of FIG. 1.

The compiler 138 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple computing nodes with the benefit of faster inter-operator communications. The compiler 138 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
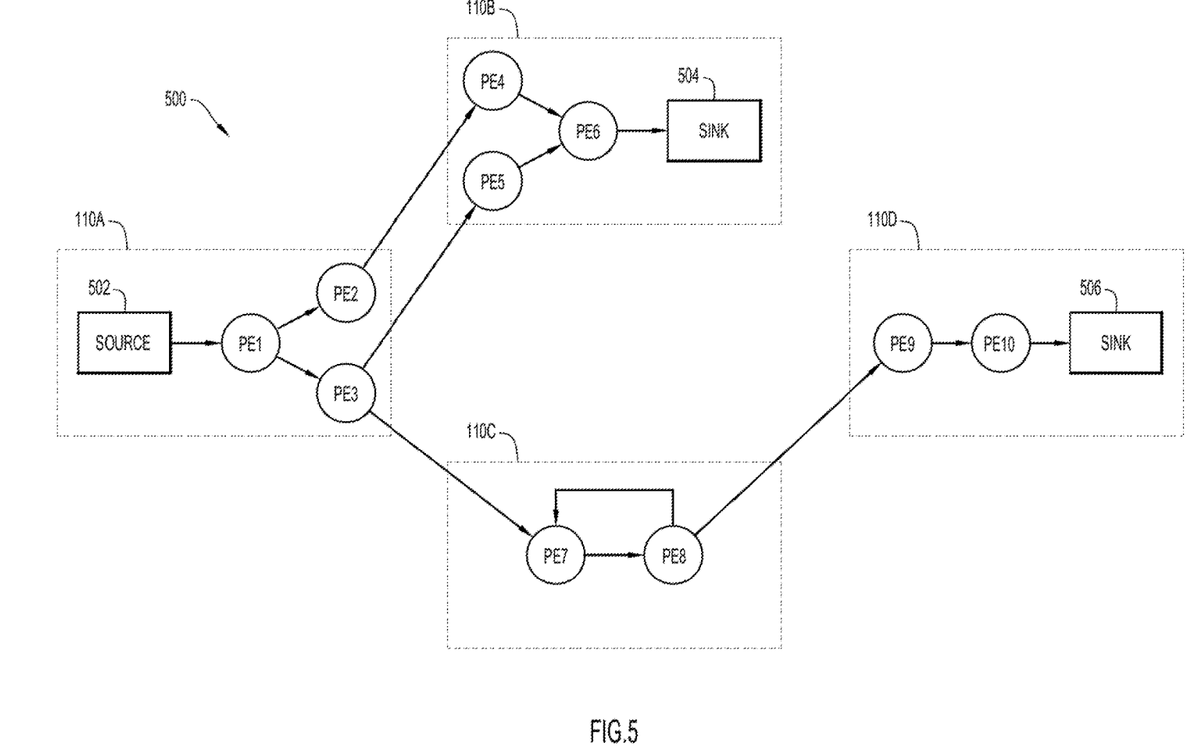
FIG. 5 illustrates an operator graph for a stream computing application according to an embodiment of the present invention.

FIG. 5 illustrates an exemplary operator graph 500 for a stream computing application beginning from one or more sources 502 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The operator graph 132 can encompass one or more processing elements, e.g., PE2 and PE4 from FIG. 5, which may each lie on a computing node, e.g., 110A and 110B, respectively. The example operator graph shown in FIG. 5 includes ten processing elements (labeled as PE1-PE10) running on the computing nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 504, 506. Computing node 110A includes the processing elements PE1, PE2, and PE3. Source 502 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on computing node 110B. Likewise, the tuples output by PE4 flow to operator PE6 and then to sink 504. Similarly, tuples flowing from PE3 to PE5 also reach sink 504 via PE6. Thus, for this example operator graph, PE6 could be configured to perform a join operation, combining tuples received from PE4 and PE5. This example operator graph also shows tuples flowing from PE3 to PE7 on computing node 110C, which itself shows tuples flowing to PE8 and looping back to PE7. Tuples output from PE8 flow to PE9 on computing node 110D, which in turn outputs tuples to be processed by operators in PE10 in route to sink 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on computing nodes, e.g., computing nodes 110A-110D, as well as to change the deployment of an operator graph, e.g., operator graph 132. For example, the stream manager 134 may move processing elements from one computing node 110 to another to manage the processing loads of the computing nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the computing nodes 110A-110D. Moreover, in monitoring the computing nodes 110A-110D, the stream manager 134 may determine the operations being performed by a specific operator and/or processing element, as well as the data being consumed, modified, or otherwise used by each of the operators and/or processing elements.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
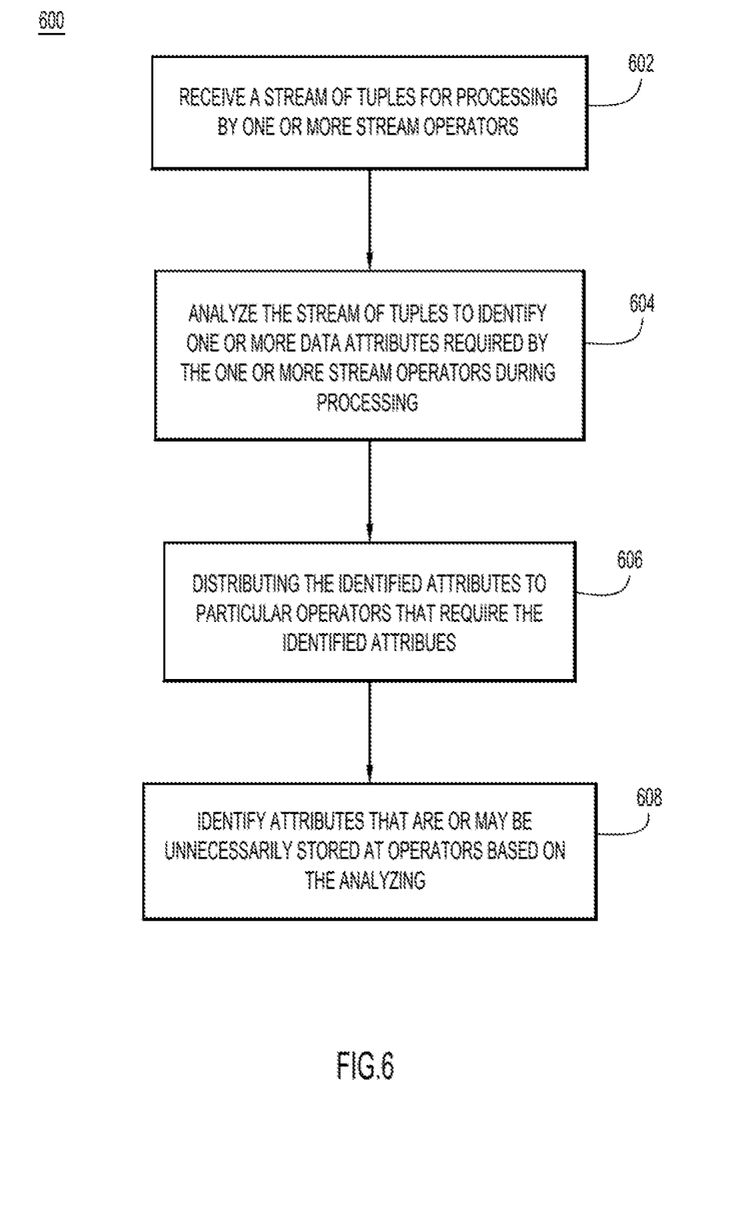
FIG. 6 is a procedural flow chart of streamlining a stream computing environment by distributing tuple attributes to associated operators in the environment, according to a present invention embodiment.

With reference now to FIG. 6, procedural flow chart 600 depicts operations (e.g., of distribution module 136) for streamlining a stream computing environment by distributing tuple attributes to associated operators in the environment. Notably, the operations depicted in flow chart 600 are handled at the platform/system level and may be transparent to a developer utilizing the platform/system.

Initially, at step 602, a stream of tuples is received for processing by one or more stream operators, such as an originating operator (e.g., PE1 from FIG. 5). In some embodiments, as a stream of tuples is received, each tuple is assigned a unique identifier. The unique identifier may be any desirable identifier and may allow each tuple to be recognized and/or located as it is propagated through an operator graph. At step 604, the stream of tuples is analyzed to identify one or more data attributes required by the one or more stream operators during processing. In some embodiments, one or more tuples may be analyzed; however, in other embodiments, each tuple included the received stream of tuples may be analyzed. As is discussed in further detail in connection with FIGS. 7 and 8, in some embodiments, the analysis involves analyzing the attributes of the tuples and comparing the attributes to determined operations/computations of the operators.

At step 606, each of the identified attributes is distributed to particular stream operators of the one or more stream operators that require the identified attributes. The distribution involves sending the attribute data to the nodes hosting the operators so that the attributes are only processed at the necessary operators as the tuples are propagated through the operator graph, even if the nodes are distributed across multiple networks.

More specifically, at runtime, attributes for each tuple are distributed to the downstream operators that will later consume each attribute. In at least some embodiments, this distribution places the attribute data (e.g., data associated with an attribute) into local memory at a node hosting the operator and keys the data to the tuple to which it belongs. For example, the data for each attribute may be distributed together with a reference to the tuple that owns that attribute (e.g., the unique identifier). Then, when a stream operator receives a tuple on an input port, the referenced attribute data used for processing in that operator will already be disposed in that operator's local memory. When a stream operator has finished processing a tuple, it can then garbage collect any local data attributes stored without concern. By comparison, if the attribute data were stored in a global memory, it may not be clear if an attribute is still needed. Moreover, if the attribute data is stored in global memory, there is no indication as to where the attribute is or will be used. Here, a determination as to where data (e.g., attribute data) is needed is made in order to determine where to store the data.

In some embodiments, data attributes may be sent to operators (at step 606) based on the analysis (performed at step 604), but the tuple may never actually be sent downstream to these operators. For example, a downstream operator may utilize an "attribute A" of Tuple 1, but an upstream operator may remove or discard Tuple 1 (e.g., the upstream operator may be a filter operator), leaving attribute A (which would have been necessary if Tuple 1 arrived) unnecessarily stored on the downstream operator. At step 608, attributes that are or may be unnecessarily stored may be identified based on the analysis of the stream of tuples. Additionally or alternatively, the identifying may be performed based on monitoring how the stream of tuples is processed through the one or more stream operators. This identification allows nodes and/or operators to be notified of attributes unnecessarily stored thereon and may allow unnecessarily stored attributes to be removed, if desired.

In one example, an explicit communication can be sent to the affected operator(s), indicating that the corresponding tuple has be dropped and, thus, the corresponding memory can be garbage collected. The communication can be generated when a tuple is detected (e.g., via monitoring) to no longer be propagating through the operator graph. Additionally or alternatively, an implicit communication, such as a detected pattern or indicator, could indicate that an attribute is being unnecessarily stored for an operator. For example, in some embodiments, the tuples may have ordered identifiers and, thus, once an operator processes a tuple or certain number of tuples that is/are too far out of order (e.g., the currently processed tuples have identifiers 100 increments higher than the tuple associated with a stored attribute), the stored attribute data may be deemed unnecessarily stored and could be discarded or garbage collected. As other examples of implicit communications, data attributes could have expiration periods, a time threshold could be used for stored data attributes, or any other such pattern or indicator could be used. The limits or thresholds associated with patterns or indicators may be predetermined or determined in any manner, such as with statistical analysis calculated during runtime. Regardless of how an unnecessary attribute is identified and the downstream operators are notified, once a data attribute is determined to be unnecessarily stored in association with an operator, the corresponding memory can be garbage collected, if desired.

However, unnecessarily stored attribute data need not always be discarded. For example, in some instances, doing nothing (e.g., leaving unnecessary attribute data in storage) may be sufficient. In fact, in some instances, garbage collecting early may waste resources. For example, if sufficient memory exists to accommodate an entire application, there is no need to garbage collect until the application has completed runtime operations. As still another alterative, in some embodiments, attributes that might be unnecessarily stored may be identified prior to distribution and then, tuple attributes may only be distributed to downstream operators when the analysis (e.g., at step 604) can guarantee that upstream operators will eventually produce a corresponding tuple for the downstream operator. In other words, in some embodiments, step 608 may precede step 606 (or be completed simultaneously, as a check). In other words, preventative techniques may be utilized to prevent attributes from being distributed to operators where the attribute may become unnecessarily stored. When preventative techniques are used, existing platform mechanisms for guaranteed delivery and fault-tolerance can be leveraged to ensure that data reaches the node on which it will be processed.

Figure 7:
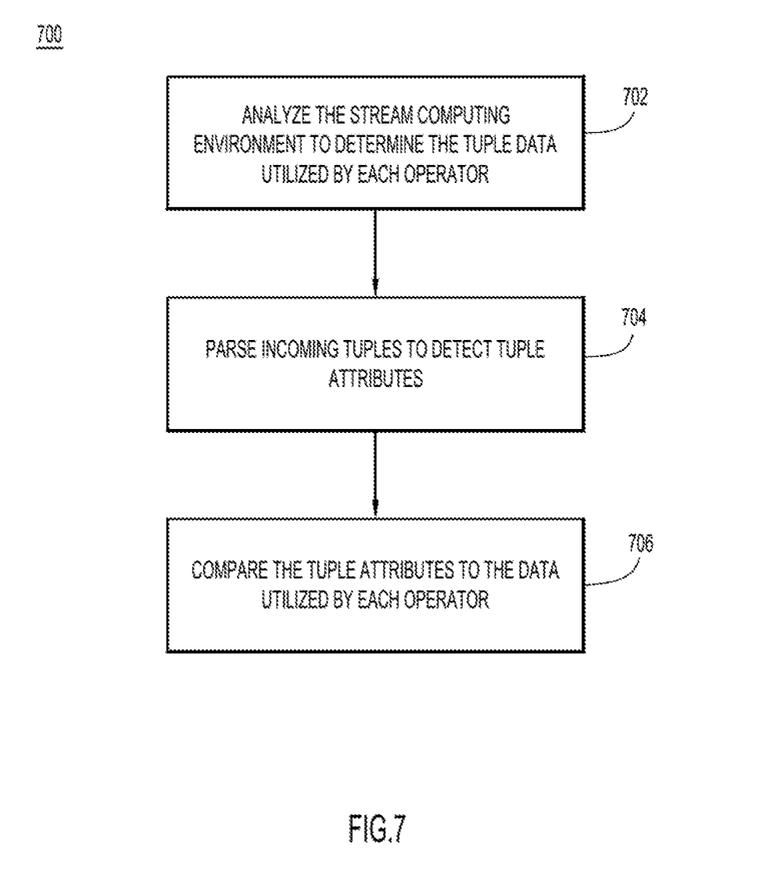
FIG. 7 is a procedural flowchart depicting operations to determine where to distribute attributes, according to a present invention embodiment.

Now referring to FIG. 7, procedural flow chart 700 depicts operations (e.g., of stream manager 134 and/or the distribution module 136) for analyzing the stream of tuples to determine attributes required by one or more stream operators (e.g., step 604) according to an example embodiment. Initially, at step 702, the computing environment/framework is analyzed to determine where tuple attributes are read, modified, consumed, etc. within an operator graph. Generally, these operations occur before any processing is performed. In at least some embodiments, this analysis includes a static analysis of the code modules of various operators to determine which tuple data attributes are required by each stream operator for their computation, as well as, which operators modify data attributes during their processing. The operator interface may also provide an indication as to what is required, based on inputs and outputs. Additionally or alternatively, the analysis at step 702 may involve an analysis of port mutability metadata. This metadata may determine the operations performed by each operator (or processing element) in a less intrusive manner. For example, in some stream computing environments, port mutability metadata may provide insight into which data attributes are input and which are output, as well as information on whether the output data attributes are modified by the computation performed by an operator.

At step 704, incoming tuples may be parsed to determine the attributes included in each tuple. In some embodiments, this parsing may include an analysis of attributes. Additionally or alternatively, attributes included in the incoming tuples may be indicated prior to introduction into the operator graph or in any other manner. At step 706, the tuple attributes are compared to the data analysis performed at step 702. This comparison may allow data attributes to be correlated with specific operators in the stream operator graph. Moreover, this analysis may indicate how to handle different tuple attributes when the operator graph includes filters or other such operators that may drop a tuple, as was discussed in connection with step 608. For example, if an operator in a particular data path is a filter operator, the operator may drop certain tuples, which may render downstream attributes for this tuple unnecessary. The analysis and comparison performed in procedural flow chart 700 may recognize this, either prior to propagation of tuples or as a tuple is dropped (e.g., filtered out) and allow a dropped upstream tuple to be handled in a number of ways, as discussed above in connection with step 608.

Figure 8:
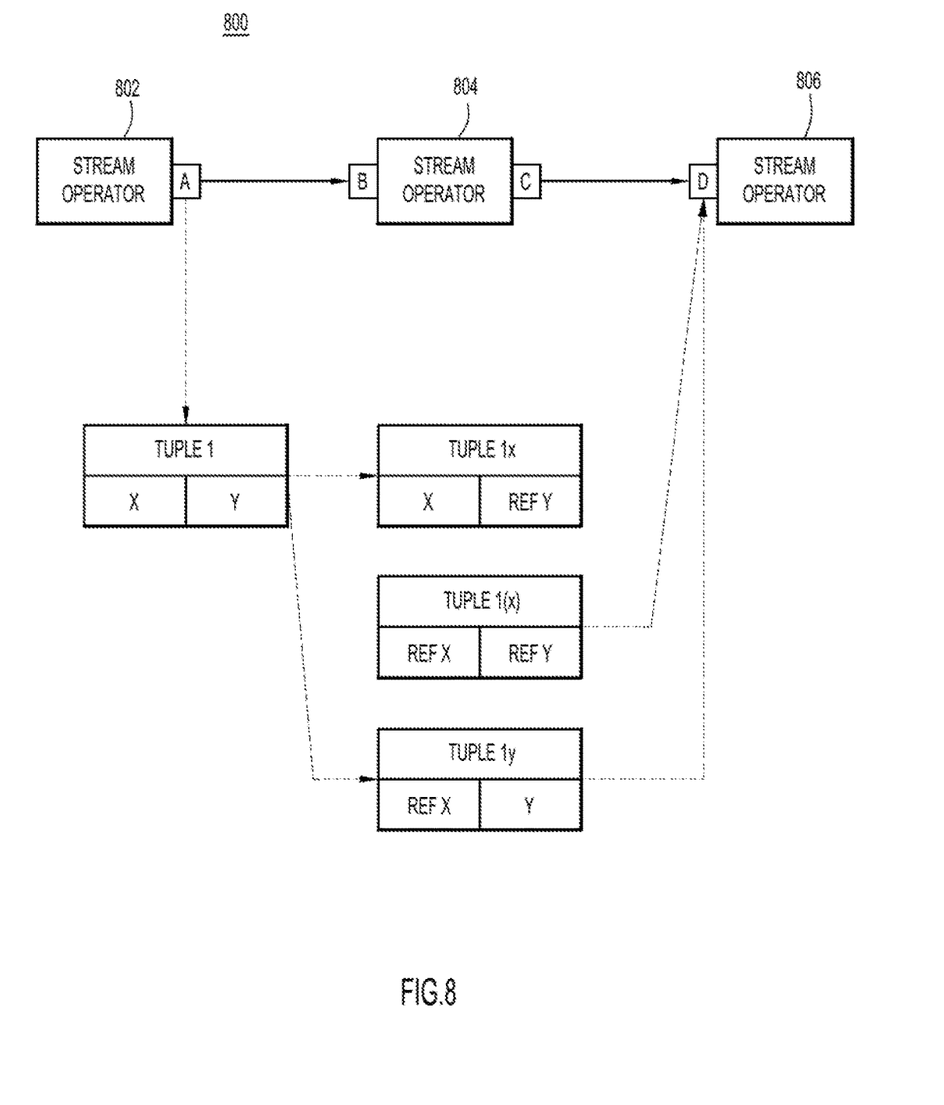
FIG. 8 illustrates an example computing environment and data flows for distributing tuple attributes to associated operators in the environment, according to a present invention embodiment.

Now referring to FIG. 8, an example computing environment 800 with three operators is shown. From a developer's perspective, the computing environment 800 processes tuples in the same manner as expected: Tuple 1 with attributes X and Y is generated by a first operator 802 and processed by both a second operator 804 and a third, sink operator 806 (e.g., an operator writing to a disk or database, or essentially any other operation that doesn't require passing data to another operator). However, since the computer environment 800 is operating in accordance with the techniques presented herein once operator 802 produces Tuple 1, the attributes X and Y need not be copy-forwarded by second operator 804.

Instead, prior to execution, an analysis is performed on the environment 800 (e.g., in accordance with step 702 of FIG. 7) to determine that the second operator 804 only uses attribute X and that the third operator 806 only uses attribute Y. Consequently, when the first operator 802 generates "Tuple 1", two attribute-specific tuples (Tuple 1x and Tuple 1y) are automatically generated and sent to the respective operators. During execution, the third operator 806 does not begin processing Tuple 1y upon receiving it. Instead, Tuple 1y is placed into local memory utilized by the third operator 806. Then, when Tuple 1 arrives at the third operator 806 (from the second operator 804), Tuple 1y can be processed. By comparison, the second operator 804 immediately processes Tuple 1x upon receiving it, just as if it had received the generated Tuple 1. In the depicted embodiment, the second operator 804 consumes attribute X and, thus, outputs a Tuple ("Tuple 1(x)") with only references to attributes X and Y.

The output from the second operator is sent to the third operator 806, where it is connected to Tuple 1y, which was already stored in local memory of operator 806. This connection allows processing to occur at operator 806 (which requires attribute Y). Notably, during this process, the second operator 804 was not required to copy-forward attribute Y. Moreover, during this process attributes are only sent to operators that need the attributes. For example, attribute Y is not sent to operator 804 and attribute X is not sent to operator 806, as this would create unnecessary traffic.

The techniques provided herein have a number of advantages. As one example, the techniques provided reduce the load on each individual operator in a streaming data path. This keeps operations small and fast so that operators can process in real-time as data arrives at their input ports without queuing or storage. By comparison, storing tuple data prior to processing is often too slow for the real-time application and sometimes unnecessary as the data useful lifetime can be short. As another example, the techniques presented herein allow operators to process incoming tuples without having to first resolve a reference to information stored in another network. In other words, the techniques presented herein provide advantageous speeds and efficiency within a data center or across a truly distributed system like the cloud, at least because data is only sent to the operators that need the data and stored on their local memory. As still another example advantage, the techniques presented herein allow for distributed decision control with regards to memory garbage collection and local memory management. Put generally, the techniques presented herein improve the performance of a stream computing environment by only sending the needed tuple attributes to the operator that uses them (instead of all operators along the path).

It will be appreciated that the embodiments described above and illustrated in the drawings represent only a few of the many ways of implementing embodiments for streamlining a stream computing environment by distributing tuple attributes to associated operators in the environment.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, distribution module 136, etc.). These systems may include any types of monitors and input devices (e.g., keyboard, mouse, voice recognition, etc.) to enter and/or view information.

It is to be understood that the software (e.g., distribution module 136) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., local area network (LAN), wide area network (WAN), Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., distribution module 136) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

The system may employ any number of any conventional or other databases, data stores or storage structures (e.g., files, databases, data structures, data or other repositories, etc.) to store information (e.g., tuple attributes, attributes utilized by operators, etc.). The database system may be implemented by any number of any conventional or other databases, data stores or storage structures (e.g., files, databases, data structures, data or other repositories, etc.) to store information (e.g., tuple attributes, attributes utilized by operators, etc.). The database system may be included within or coupled to the server and/or client systems. The database systems and/or storage structures may be remote from or local to the computer or other processing systems, and may store any desired data (e.g., tuple attributes, attributes utilized by operators, etc.).

The present invention embodiments may employ any number of any type of user interface (e.g., Graphical User Interface (GUI), command-line, prompt, etc.) for obtaining or providing information (e.g., e.g., tuple attributes, attributes utilized by operators, etc.) where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touchscreen, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture, instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for processing a stream of tuples comprising:
    receiving a stream of tuples for processing by one or more stream operators;
    analyzing a tuple in the stream of tuples and identifying one or more data attributes of the tuple required by the one or more stream operators during processing, wherein the identifying one or more data attributes of the tuple comprises:
        analyzing code modules of the one or more stream operators to determine data attributes required for computation and data attributes modified by the one or more stream operators; and
        comparing data attributes of the tuple to the analysis of the code modules to identify the one or more data attributes;
    distributing at least one of the identified attributes to local storage of particular stream operators of the one or more stream operators that require the identified attributes; and
    processing the tuple through the one or more stream operators, wherein the distributed data attributes are processed at the particular stream operators from local storage upon receiving the processed tuple during propagation through the one or more stream operators.

2. The method of claim 1, wherein distributing further comprises:
    sending the identified attributes to a node hosting the particular operator.

3. The method of claim 2, wherein the identified attributes are stored in local memory of the node.

4. The method of claim 1, further comprising:
    providing an indication that the tuple is no longer required and may be removed.

5. The method of claim 1, further comprising:
    detecting the identified attributes associated with removed tuples that are unnecessarily stored at the particular stream operators.

6. The method of claim 1, wherein the stream operators are distributed across multiple networks.

7. A system for processing a stream of tuples comprising:
    a processor configured to:
        receive a stream of tuples for processing by one or more stream operators;

analyze a tuple in the stream of tuples and identify one or more data attributes of the tuple required by the one or more stream operators during processing, wherein the identifying one or more data attributes of the tuple comprises:
  analyzing code modules of the one or more stream operators to determine data attributes required for computation and data attributes modified by the one or more stream operators; and
  compare data attributes of the tuple to the analysis of the code modules to identify the one or more data attributes;
distribute at least one of the identified attributes to local storage of particular stream operators of the one or more stream operators that require the identified attributes; and
process the tuple through the one or more stream operators, wherein the distributed data attributes are processed at the particular stream operators from local storage upon receiving the processed tuple during propagation through the one or more stream operators.

8. The system of claim 7, wherein distributing at least one of the identified attributes further comprises:
sending the identified attributes to a node hosting the particular operator.

9. The system of claim 8, wherein the identified attributes are stored in local memory of the node.

10. The system of claim 7, wherein the processor is further configured to:
provide an indication that the tuple is no longer required and may be removed.

11. The system of claim 7, wherein the processor is further configured to:
detect the identified attributes associated with removed tuples that are unnecessarily stored at the particular stream operators.

12. The system of claim 7, wherein the stream operators are distributed across multiple networks.

13. A computer program product for processing a stream of tuples, the computer program product comprising a computer readable storage medium having program instructions embodied therewith, the program instructions executable by a processor to cause the processor to:

receive a stream of tuples for processing by one or more stream operators;
analyze a tuple in the stream of tuples and identify one or more data attributes of the tuple required by the one or more stream operators during processing, wherein the identifying one or more data attributes of the tuple comprises:
  analyzing code modules of the one or more stream operators to determine data attributes required for computation and data attributes modified by the one or more stream operators; and
  comparing data attributes of the tuple to the analysis of the code modules to identify the one or more data attributes;
distribute at least one of the identified attributes to local storage of particular stream operators of the one or more stream operators that require the identified attributes; and
process the tuple through the one or more stream operators, wherein the distributed data attributes are processed at the particular stream operators from local storage upon receiving the processed tuple during propagation through the one or more stream operators.

14. The computer program product of claim 13, wherein distributing at least one of the identified attributes further comprises:
storing the identified attributes in local memory of a node hosting the particular operator.

15. The computer program product of claim 13, further comprising program instructions executable by the processor to cause the processor to:
provide an indication that the tuple is no longer required and may be removed.

16. The computer program product of claim 13, further comprising program instructions executable by the processor to cause the processor to:
detect the identified attributes associated with removed tuples that are unnecessarily stored at the particular stream operators.

17. The computer program product of claim 13, wherein the stream operators are distributed across multiple networks.

* * * * *